Jan. 29, 1935. M. C. PHENIX 1,989,288
DOWEL PIN CHUCK
Filed May 17, 1933 2 Sheets-Sheet 1
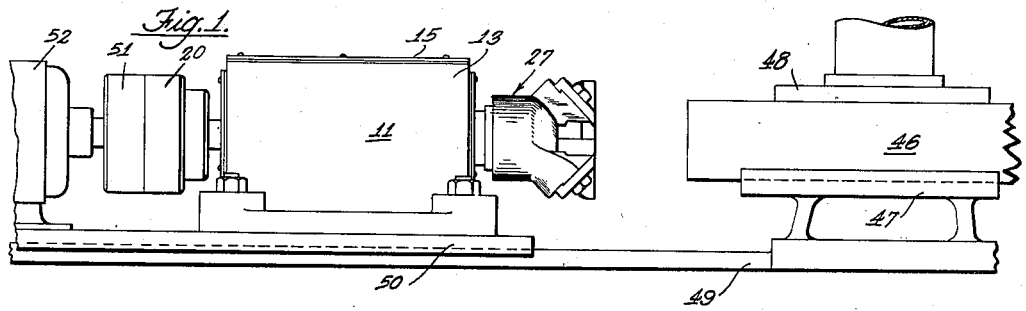
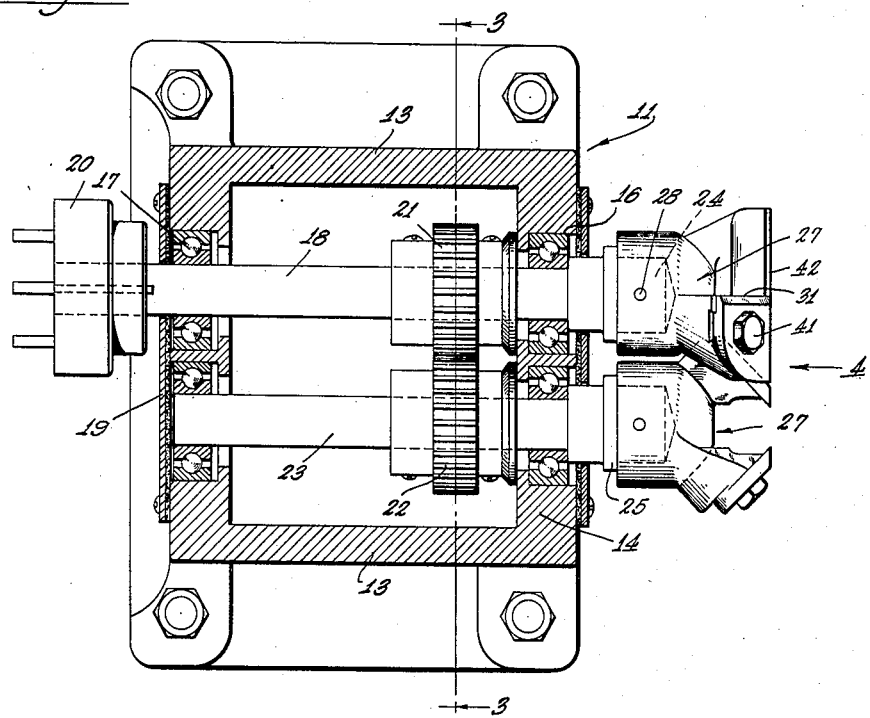
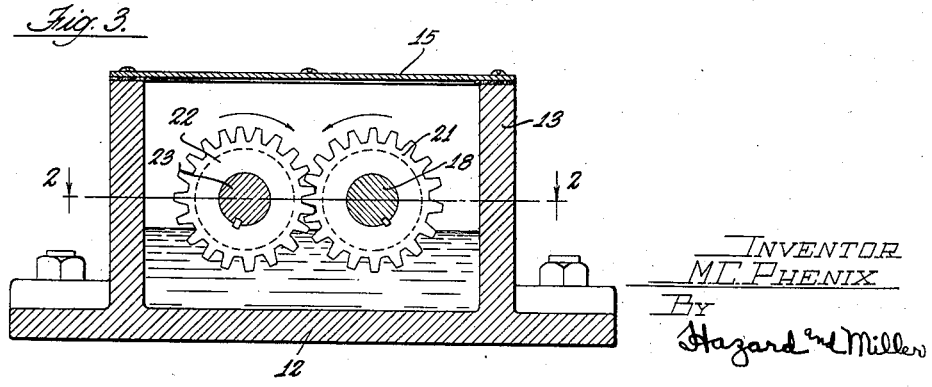
INVENTOR
M. C. PHENIX
By Hazard and Miller
ATTORNEYS Jan. 29, 1935.　　　M. C. PHENIX　　　1,989,288

DOWEL PIN CHUCK

Filed May 17, 1933　　　2 Sheets-Sheet 2

INVENTOR
M. C. PHENIX
By
Hazard and Miller
ATTORNEYS

Patented Jan. 29, 1935

1,989,288

UNITED STATES PATENT OFFICE 1,989,288

DOWEL PIN CHUCK

Maurice C. Phenix, Los Angeles, Calif.

Application May 17, 1933, Serial No. 671,504

16 Claims. (Cl. 144—204)

My invention relates to a double dowel pin cutter, in which two parallel pins are cut at the same time on the end of a block of wood.

An object and feature of my invention is the employment of a pair of cutters rotating on parallel axes, said cutters overlapping in rotation, whereby the end of a block may be trimmed or cut with overlapping cuts until two parallel dowels are formed.

A further object and feature of my invention is forming the cutters each with a pair of cutting blades, the blades of each pair being adjustably spaced apart the diameter of the dowels, whereby on rotation of each pair of cutters, these cutters may overlap and remove the material from between the two dowels as well as the wood surrounding the dowels and thus leave two complete parallel dowels extending outwardly from the plane surface of the end of the piece of wood.

A further object and feature of my invention is mounting the cutters each on a shaft, these shafts being parallel and driven in reverse direction so that in the space between the dowels the cutting blades move in the same direction and as the blades of the two cutters are spaced from each other they cannot meet or contact in the space between the two dowels.

Another feature of my invention is constructing the shape of the cutters and the blades so that, if desired, two circular overlapping recesses or sockets may be formed in the end of a block of wood with two dowels extending outwardly from the base of said sockets. To effect this necessitates forming the blades with an arcuate back non-cutting edge so that the blades may rotate in a cylindrical cut.

Another detailed feature of my invention is constructing the cutting blades with a side at right angles to the cutting edge and an arcuate non-cutting edge connecting the opposite ends of the cutting and non-cutting edge. The blade is provided with, preferably, a dovetailed projection to operate in a dove-tailed slide on the blade carrier. This allows adjustment of the blades to form dowel pins of different diameters.

My invention is illustrated in connection with the accompanying drawings, in which:

Fig. 1 is a side elevation showing the mounting of my machine and the manner of feed in operation.

Fig. 2 is a horizontal section on the line 2—2 of Fig. 3 in the direction of the arrows.

Fig. 3 is a vertical transverse section on the line 3—3 of Fig. 2 in the direction of the arrows.

Figure 4:
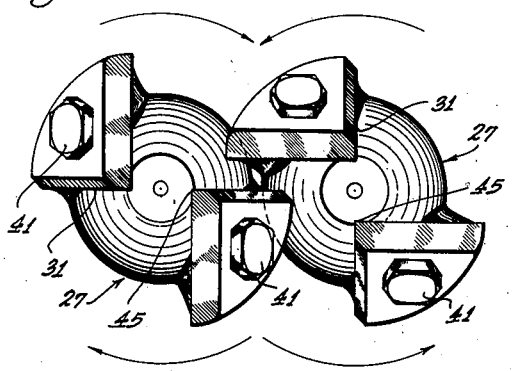
Fig. 4 is an end elevation taken in the direction of the arrow 4 of Fig. 2 with the cutting blades in one relative position.

Referring first to Figs. 2 and 3. These illustrate a gear box housing 11 having a floor 12, opposite side walls 13, opposite end walls 14, and a cover plate 15. The end walls are provided with openings 16 for bearings in which there are the anti-friction bearings 17. A first or drive shaft 18 is mounted in a pair of bearings. Cover plates 19 with gaskets form a close fit on the various projecting shafts to make the gear box grease tight. The shaft 18 has a driving head 20 which may be connected to a suitable clutch or coupling or the like. The drive shaft 18 has a gear 21 thereon which meshes with a driven gear 22 on the driven shaft 23. These gears are of equal size and ratio. The end of each shaft has a chuck head 24 with a collar 25 adjacent thereto. This clutch head fits in a socket 26 in a cutter head 27 (note Fig. 6), and is secured by a pin 28 or the like. It is to be understood that any suitable device may be used for attaching the cutter heads to the driving and driven shafts.

Each cutter head 27 has two cutter supports 29. These supports are diametrically opposite and have an inclined surface 30 which is, preferably, at forty five degrees with the axial line of the cutter head. Each head has a center edge 31. These edges 31 of diametrically opposite cutter supports are in a diametrical line. There is also an inner face 32 for each cutter support, this extending toward the center portion 33. This face meets the edge 31 at a right angle. A sharp lip 34 is formed between the inside face 32 and the surface 30. The face 30 is provided with a dovetailed groove 35 having a pair of stop pins 36 therein and in the center of the groove there is a threaded socket 37.

Attached to each face 30 there is a cutter blade

Figure 6:
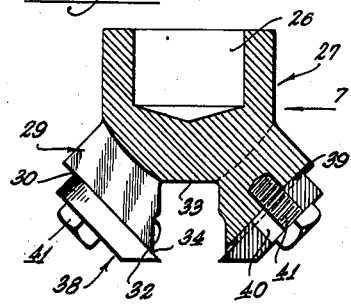
Fig. 6 is a longitudinal section through a cutter and blade on the line 6—6 of Fig. 5 in the direction of the arrows.
Figure 5:
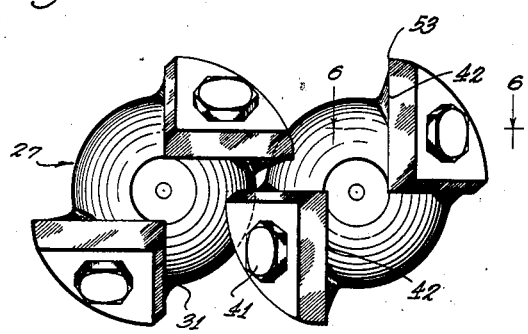
Fig. 5 is an elevation similar to Fig. 4 with the cutting blades in another relative position.
Figure 7:
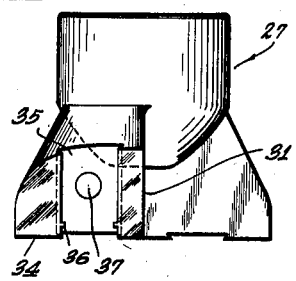
Fig. 7 is a side elevation of the cutter head taken in the direction of the arrow 7 of Fig. 6 with the blades removed.
Figure 8:
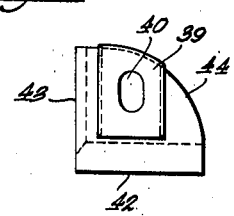
Fig. 8 is a rear or inside elevation of one of the blades.

38. Each cutter blade has a dove-tailed projection 39 to slide in the dove-tailed groove 35 and is provided with an elongated slot 40, through which extends the clamping screw 41 to adjust the blade on the face 30. The blade is provided with a cutting edge 42 which is parallel to the lip 34 and may extend slightly inside of such lip, as indicated in Fig. 6. The blade has a side edge 43 which is at right angles to the cutting edge 42. The back edge 44 is arcuate to fall within a circle which may be cut by the cutting blades.

The cutter supports and the cutter heads are arranged so that when the faces 31 of one of the cutter heads are in alignment with the center of the cutter head, the faces 31 of the outer cutter are at right angles to such line, this being illustrated in Fig. 4, in which in the left hand cutter a continuation of the plane of the surfaces 34 would intercept the center of the right hand cutter and the surfaces 31 of the right hand cutter intersect at right angles this plane through its center. The edges 43 of the cutter blades are designed to be in alignment with the surfaces 31. This arrangement makes it possible that the cutters may rotate in opposite directions, as illustrated by the arrows in Fig. 4 without the cutter blades ever coming in contact. The corners 45 of each pair of cutter blades of each cutter head define the diameter of the dowel to be cut and the blades may be adjusted in the slots 35 to increase or decrease the diameter of the dowels.

In Fig. 1 the work or block of wood to be cut is indicated at 46, which rests on the holder 47 and is held therein by a clamp 48. The holder is fixed to a base 49 on which a carriage 50 may slide. This carriage has the gear box housing 11 mounted thereon, a drive coupling 51 engaging the driving head 20 and an electric motor power supply 52.

Figure 9:
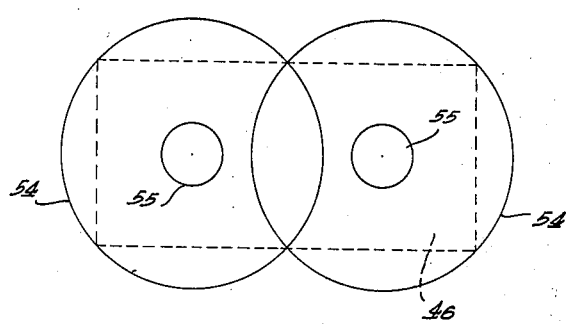
Fig. 9 is an outline view to illustrate the overlapping cuts in forming the parallel dowels.
Figure 10:
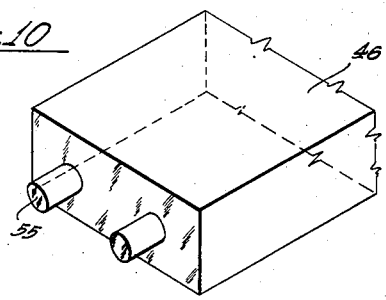
Fig. 10 is a perspective view of a block having two parallel dowels formed thereon.

The manner and operation of the cutters is shown in connection with Figs. 9 and 10, in which Fig. 9 shows an end view of the block to be cut, this being dotted. The outer corner 53 of the cutters describes circles 54. These circles overlap between the dowels 55; the diameter of which dowels, as above mentioned, is regulated by the distance apart of the corners 45 of the cutters. The cutters, therefore, remove all of the end of the block except the two dowels, as illustrated in Fig. 10.

It is obvious that by arranging more than two shafts in the same plane of gear driven and having additional cutters of the same type as illustrated and described above that three or more dowels may be cut at the same time. It will also be obvious that should the block of wood be of greater area than that defined within the circles formed by the cutters that a recess or socket may be formed in the end of the block, leaving the dowels. The wood may then be later removed, if desired, to the base of the dowels.

An important characteristic of my invention is that the cutter blades operate on the wood with a shearing cut. This is due to the fact that each pair of blades for cutting a dowel each have a cutting edge tangential to the dowel to be formed by such blades and the blades of each pair are parallel one to the other. Therefore, as each cutter head rotates the blades mounted thereon have not only a rotational movement as regards the dowel and the surrounding wood they are cutting, but also have a shearing movement in regard to the fibres of wood, whereby individual fibres of the wood are acted on by a cutting edge which moves, in effect, sidewise, as regards the fibre. Therefore, in my invention I have not only developed a dowel cutter for cutting parallel dowels but also a method in which the cutting is done by a shearing action.

Various changes may be made in the details of construction without departing from the spirit or scope of the invention as defined by the appended claims.

I claim:

1. A machine for cutting dowels comprising a pair of rotatable cutter heads, cutters eccentrically mounted upon the cutter heads, the cutting edges on the cutters being movable in the same plane and through overlapping circles in said plane, and means for mounting and rotating the cutter heads in such a manner that the cutters on the two cutter heads will not interfere with each other on passing through the overlapping portions of the circles.

2. A machine for cutting dowels comprising a pair of rotatable cutter heads having cutters thereon with cutting edges arranged to cut in the same plane on rotation of the cutter heads and at points spaced from the axes of rotation of the cutter heads enabling the formation of dowels co-axially with the axes of rotation of the cutter heads, the cutting edges on the cutters being arranged to pass through overlapping circles, and means for mounting and rotating the cutter heads in such a manner that the cutters on the cutter heads will not interfere with each other on passing through the overlapping portions of the circles.

3. A machine for cutting dowels comprising a pair of cutter heads rotatable on parallel shafts, meshing cutters on the ends of the cutter heads spaced from the axes of rotation of the cutter heads, and means for rotating the cutter heads in opposite directions, said cutters being positioned to form a cut in a common plane at right angles to the axes of rotation.

4. A machine for cutting dowels comprising a pair of cutter heads rotatable on parallel shafts, meshing cutters on the ends of the cutter heads spaced from the axes of rotation of the cutter heads, and means for rotating the cutter heads in opposite directions, the cutters having cutting edges arranged to cut in the same plane at right angles to their axes of rotation.

5. A machine for cutting dowels comprising a pair of cutter heads rotatable on parallel shafts, meshing cutters on the ends of the cutter heads spaced from the axis of rotation of their respective cutter heads, and means for rotating the cutter heads synchronously in opposite directions, each cutter having cutting edges at right angles to its axis of rotation.

6. A machine for cutting dowels comprising a pair of cutter heads rotatable on parallel shafts, meshing cutters on the ends of the cutter heads spaced from the axis of rotation of their respective cutter heads, and means for rotating the cutter heads synchronously in opposite directions, and cutters on the cutter heads being spaced from each other while in mesh so as not to engage during rotation, said cutters each having cutting edges positioned at an angle to the axis of rotation of its cutter.

7. A machine for cutting dowels comprising a pair of cutter heads, means connecting the cutter heads and causing them to rotate about parallel axes and at the same speed of rotation but in opposite directions, and meshing cutting means on the ends of the cutter heads, said cutting means being positioned to form a cut in a common plane at right angles to their axes of rotation.

8. A machine for cutting dowels comprising a pair of cutter heads, means connecting the cutter heads and causing them to rotate about parallel axes and at the same speed of rotation but in opposite directions, and meshing cutting means on the ends of the cutter heads, said cutting means being spaced from the axes of rotation of the cutter heads the radii of the dowels so as to form dowels in cutting, said cutting means being positioned to form a cut in a common plane at right angles to the axes of rotation.

9. A machine for cutting dowels comprising a pair of cutter heads, means connecting the cutter heads causing them to rotate about parallel axes and at the same speed of rotation but in opposite directions, cutting means on the end of each cutter head, the cutting means on one head being arranged to traverse a portion of the path traversed by the cutting means on the adjacent cutter head when cutting, each cutting means having a cutting edge positioned at an angle to the axis of rotation of its cutting means.

10. The method of forming dowels on the end of a block of wood which consists of simultaneously cutting the end of a block on two overlapping circular paths, which paths are spaced from the centers about which the paths extend so as to leave dowels formed inside of the paths.

11. The method of forming dowels on the end of a block of wood which consists of simultaneously cutting the end of the block on two overlapping circular paths, which paths are spaced from the centers about which the paths extend so as to leave dowels formed inside of the paths, the length of the overlap being at least as long as the thickness of the block.

12. The method of forming dowels in the end of a block of wood which consists of removing by cutting means in one operation the entire end of the block around two or more spaced circles which define the ends of the dowels.

13. The method of forming dowels in the end of a block of wood which consists of removing by cutting means in one operation the entire end of the block around two or more spaced circles which define the ends of the dowels, and in so doing having each cutting means traverse an area common to the paths of all of the cutting means.

14. A machine for cutting dowels comprising a pair of cutter heads, means gearedly connecting the heads to cause them to rotate in synchronism about parallel axes, cutting means spaced apart on the end of each cutter head, the cutting means on one head being arranged to traverse during its rotation a portion of the path traversed by the cutting means on the other cutter head, the cutting means on both cutter heads being arranged to leave uncut portions co-axial with the axes of rotation of the cutter heads.

15. A machine for cutting dowels comprising a pair of cutter heads, means gearedly connecting the heads to cause them to rotate in synchronism about parallel axes, a pair of cutters spaced apart on the end of each cutter head, each with a cutting edge arranged to traverse a path spaced from the axis or rotation of the cutter heads so as to leave uncut portions forming dowels and each edge cutting in a plane at right angles to its axis of rotation.

16. A machine for cutting dowels comprising a pair of cutter heads, means gearedly connecting the heads to cause them to rotate in synchronism about parallel axes, a pair of cutters spaced apart on the end of each cutter head, each arranged to traverse a path spaced from the axis of rotation of the cutter heads so as to leave uncut portions forming dowels, the cutters on one cutter head being arranged to traverse during their rotation a portion of the path traversed by the cutters on the other cutter head.

MAURICE C. PHENIX.